(12) United States Patent
Nishikawa

(10) Patent No.: US 8,642,163 B2
(45) Date of Patent: Feb. 4, 2014

(54) ULTRAVIOLET-CURABLE INKJET INK SET AND COLORED BOARD FOR OUTDOOR USE PRINTED BY USING THE INK SET

(75) Inventor: Tomoyuki Nishikawa, Fukui (JP)

(73) Assignee: Seiren Co., Ltd., Fukui (JP)

( * ) Notice: Subject to any disclaimer, the term of this patent is extended or adjusted under 35 U.S.C. 154(b) by 612 days.

(21) Appl. No.: 12/443,193

(22) PCT Filed: Sep. 10, 2007

(86) PCT No.: PCT/JP2007/067580
§ 371 (c)(1),
(2), (4) Date: Mar. 27, 2009

(87) PCT Pub. No.: WO2008/038508
PCT Pub. Date: Apr. 3, 2008

(65) Prior Publication Data
US 2010/0092736 A1    Apr. 15, 2010

(30) Foreign Application Priority Data
Sep. 27, 2006  (JP) .................................. 2006-262828

(51) Int. Cl.
*B32B 3/10* (2006.01)

(52) U.S. Cl.
USPC .......... 428/207; 428/195.1; 283/56; 427/256; 522/75

(58) Field of Classification Search
USPC ................. 428/195.1, 207; 522/75; 427/256; 283/265
See application file for complete search history.

(56) References Cited

U.S. PATENT DOCUMENTS

2007/0157849 A1 *   7/2007   Kluge et al. ............... 106/31.33

FOREIGN PATENT DOCUMENTS

| JP | 11-012512 | | 1/1999 |
|---|---|---|---|
| JP | 2001-055530 | | 2/2001 |
| JP | 2003-342503 | | 12/2003 |
| JP | 2003-342503 A | * | 12/2003 |
| JP | 2004-018546 | | 1/2004 |
| JP | 2006-008870 | | 1/2006 |
| WO | WO 2005083017 A1 | * | 9/2005 |

OTHER PUBLICATIONS

International Preliminary Report on Patentability and Written Opinion; International application No. PCT/JP2007/067580; International filing date: Sep. 10, 2007, mailed Apr. 9, 2009.

* cited by examiner

Primary Examiner — Mark Ruthkosky
Assistant Examiner — Christopher Polley
(74) Attorney, Agent, or Firm — Antonelli, Terry, Stout & Kraus, LLP.

(57) ABSTRACT

Disclosed is an ultraviolet-curable inkjet ink set composed of a yellow ink, a magenta ink and a cyan ink, respectively containing a pigment, a reactive monomer and/or a reactive oligomer and a photopolymerization initiator. This ultraviolet-curable inkjet ink set is characterized in that the yellow ink contains at least a bismuth vanadate compound or iron oxide, the magenta ink contains at least iron oxide or a condensed polycyclic compound and the cyan ink contains at least a phthalocyanine compound, as their respective pigments. Also disclosed is a colored board for outdoor use, which is printed by using the ink set. The inkjet ink set realizes high-concentration printing, and enables to obtain a brilliant printed matter excellent in color presentation and weather resistance.

12 Claims, 1 Drawing Sheet

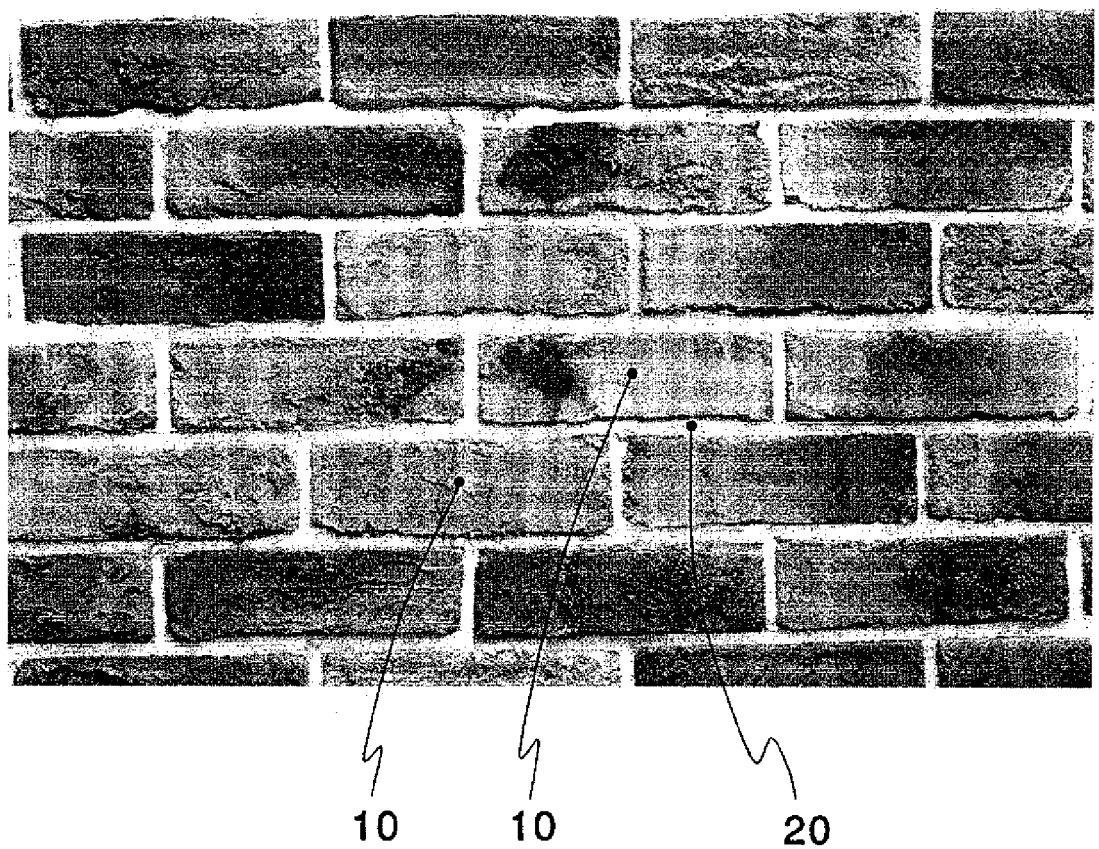

ULTRAVIOLET-CURABLE INKJET INK SET AND COLORED BOARD FOR OUTDOOR USE PRINTED BY USING THE INK SET

TECHNICAL FIELD

The present invention relates to an ultraviolet-curable inkjet ink set and a colored board for outdoor use printed by using the ink set. Further specifically, it relates to an ultraviolet-curable inkjet ink set capable of conducting high-concentration printing and obtaining a brilliant printed matter being excellent in color representation and weather resistance, and a colored board for outdoor use printed by using the ink set.

BACKGROUND ART

In recent years, as a technique other than water-based or solvent-based inkjet print, inkjet print using an ultraviolet-curable resin has been studied. Since this ultraviolet-curable resin has a feature that the resin is cured instantly by ultraviolet ray irradiation, it has a merit that no ink absorbing layer is required for a recording base material. Because of this merit, usage of the above-described ultraviolet-curable resin has been studied as a coloring material for applications not only coloring on paper but also on various raw materials such as film, plastic, metal and glass.

Since the ultraviolet-curable resin becomes a hardened film excellent in scratching hardness and adhesion to a base material, the recorded matter can be used both indoors and outdoors. However, being compared with indoor use, in the case of outdoor use such as building materials and advertising displays for example, excellent weather resistance being able to respond to all natural conditions is necessary. Weather resistance is resistance specifically when exposed to heat, light, water and so forth. The recorded matter must be kept for a certain period of time even under such environment without changing color of printed image and degrading the printed image, and an ink layer must not crack or exfoliate from a base material. In general, ultraviolet-curable resins are superior to other resins in weather resistance, but not sufficient yet.

Therefore, inks for inkjet in outdoor use have been the subject of daily study, and as a coloring material, use of organic pigments superior to dyes in light resistance has just started. However, in an outdoor application, even in the case that organic pigments are used, color degradation cannot be avoided because of exposure to sunlight for a long period of time. In an outdoor application, it is necessary to have light resistance such that the coloring suffers almost no color degradation after being exposed for 5 to 10 years outdoors.

Hence, there is a method of using inorganic pigments with more excellent light resistance than organic pigments as a coloring agent. For example, in Japanese Unexamined Patent Publication No. 2001-55530, there is disclosed a color printing method which uses an inorganic composite oxide pigment, and has excellent light resistance and weather resistance, and further has an excellent visibility of hue. However, in this method, although light resistance is improved because of using an inorganic pigment, a printed matter with high-concentration cannot be obtained because an inorganic pigment is inferior to an organic pigment in coloring power.

The inorganic composite oxide pigment used there tends to be pale in color due to possible breakdown of crystalline structure when excessively dispersed. Above all, since a yellow inorganic composite oxide pigment and a blue inorganic composite oxide pigment are poor in coloring power, when color concentration is tried to be increased, a very large amount of pigment is required, from which an inkjet ink cannot be realized. Thus, substantially it becomes difficult to make ink color concentration higher. Since inorganic composite oxide pigments has no brilliant red color, there is a problem that representation of neutral color from yellow to red, orange color for example, or representation of neutral color from red to blue, purple color for example is poor.

Generally for obtaining a high-concentration printed matter, solid content of pigment in an ink may be increased, but the compoundable amount of reactive monomer and/or reactive oligomer decreases, and the ink becomes viscous, making the discharge difficult, thereby clogging of nozzles may occur as well. Therefore, there is a limitation in the increment of the solid content of pigment in an ink for inkjet printing.

In this way, there has not been developed yet an ultraviolet-curable inkjet ink set capable of conducting high-concentration printing and obtaining a brilliant printed matter being excellent in color representation and weather resistance.

DISCLOSURE OF INVENTION

The object of the present invention is to provide an ultraviolet-curable inkjet ink set capable of conducting high-concentration printing and obtaining a brilliant printed matter being excellent in color representation and weather resistance, and a colored board for outdoor use printed by using the ink set.

The present invention has been achieved by finding out that high-concentration printing and a brilliant color representation become possible by combination of a specific yellow pigment, red pigment and blue pigment, and further a printed matter with very good weather resistance can be obtained.

Namely, the present invention relates to an ultraviolet-curable inkjet ink set including a yellow ink, a magenta ink and a cyan ink respectively containing a pigment, a reactive monomer and/or a reactive oligomer, and a photopolymerization initiator, wherein as the pigment, the yellow ink includes at least a bismuth vanadate compound or iron oxide, the magenta ink includes at least iron oxide or a condensed polycyclic compound and the cyan ink includes at least a phthalocyanine compound.

It is preferable that the pigment included in the yellow ink is C.I. pigment yellow 184 and/or C.I. pigment yellow 42; the pigment included in the magenta ink is at least one selected from C.I. pigment red 101, C.I. pigment red 102, C.I. pigment red 149, C.I. pigment red 168, C.I. pigment red 178, C.I. pigment red 179, C.I. pigment red 190, C.I. pigment red 224, C.I. pigment red 242, C.I. pigment red 254, C.I. pigment red 255, C.I. pigment red 270 and C.I. pigment red 272; and the pigment included in the cyan ink is at least one selected from C.I. pigment blue 15, C.I. pigment blue 15:1, C.I. pigment blue 15:2, C.I. pigment blue 15:3, C.I. pigment blue 15:4, C.I. pigment blue 15:6 and C.I. pigment blue 16.

It is preferable that an average particle diameter of the pigment included in the yellow ink is 50 to 200 nm, an average particle diameter of the pigment included in the magenta ink is 30 to 300 nm, and an average particle diameter of the pigment included in the cyan ink is 50 to 150 nm.

It is preferable that the pigments are contained by 0.1 to 10% by weight in respective inks.

The present invention further relates to an ultraviolet-curable inkjet ink set for outdoor use including the ultraviolet-curable inkjet ink set. In addition, it relates to a colored board for outdoor use printed by using the ultraviolet-curable inkjet ink set.

BRIEF DESCRIPTION OF DRAWING

FIG. 1 is a view showing a colored design printed in brick-pattern by discharging inks onto a metal plate using the ink set of the present invention.

BEST MODE FOR CARRYING OUT THE INVENTION

The ultraviolet-curable inkjet ink set including a yellow ink, a magenta ink and a cyan ink according to the present invention uses specific pigments as pigments of respective inks.

The foregoing yellow ink includes at least a bismuth vanadate compound or iron oxide as a yellow inorganic pigment. As the bismuth vanadate compound, C.I. pigment yellow 184 is preferable. As the iron oxide, C.I. pigment yellow 42 is preferable. Among these, C.I. pigment yellow 184 is particularly preferable from the point of having coloring power and brilliant yellow.

The average particle diameter of the bismuth vanadate compound or iron oxide is preferably in a range of 50 to 200 nm from the point of obtaining a brilliant yellow ink and printed matter, and more preferably in a range of 70 to 150 nm. When the average particle diameter is less than 50 nm, coloring power tends to be weak, and when more than 200 nm, discharge from a nozzle tends to be difficult. This is because an inorganic pigment has a large density and easily precipitates.

In this way, by using a bismuth vanadate compound and/or iron oxide as a yellow inorganic pigment, a brilliant yellow can be obtained, even when mixed with a magenta ink or a cyan ink described below, it is possible to obtain a neutral color such as orange and green with little dullness while representing a wide range of hue.

The foregoing magenta ink includes at least iron oxide or a condensed polycyclic compound as a red pigment. As the iron oxide, C.I. pigment red 101 and C.I. pigment red 102 are preferable. As the condensed polycyclic compound, from the point of having coloring power and being brilliant, preferable are C.I. pigment red 149, C.I. pigment red 168, C.I. pigment red 178, C.I. pigment red 179, C.I. pigment red 190, C.I. pigment red 224, C.I. pigment red 242, C.I. pigment red 254, C.I. pigment red 255, C.I. pigment red 270 and C.I. pigment red 272. Among these, in particular from the point of excellent light resistance, pigment red 149, C.I. pigment red 178 and C.I. pigment red 179 are particularly preferable.

The average particle diameter of the foregoing iron oxide is preferably in a range of 50 to 300 nm from the point of obtaining a brilliant magenta ink and printed matter, and more preferably in a range of 70 to 200 nm. When the average particle diameter is less than 50 nm, yellowness becomes strong, which tends to be orange color, and when more than 300 nm, blueness becomes strong, which tends to be violet, and the density is large and precipitation easily occurs, so there is a tendency that discharge from a nozzle becomes difficult.

The condensed polycyclic compound is an organic compound, but it forms a crystalline structure in which molecules are stacked, and it is stable as a giant molecule by intermolecular hydrogen bonds between many pigments, so the condensed polycyclic compound is most excellent in light resistance among organic pigments, and it is a pigment hardly causing color degradation even in outdoor use. The average particle diameter of the condensed polycyclic compound is preferably 30 to 200 nm, and more preferably 50 to 150 nm. When the average particle diameter is less than 30 nm, weather resistance tends to be weak, and when more than 200 nm, discharge from a nozzle tends to be difficult.

In this way, by using iron oxide or a condensed polycyclic compound as the red inorganic pigment, a very brilliant red color can be obtained, even when mixed with the foregoing yellow ink or a cyan ink described below, it is possible to obtain a neutral color such as orange and purple with little dullness while representing a wide range of hue.

The foregoing cyan ink includes at least a phthalocyanine compound as a blue pigment. The phthalocyanine compound is an organic pigment, but has a structure that a metal atom is coordinated at the center of molecule, and phthalocyanine molecules are stable as crystal by intermolecular force between many molecules, so it is most excellent in light resistance among organic pigments, and it is a pigment hardly causing color degradation. As the phthalocyanine compound, it is preferably at least one selected from C.I. pigment blue 15, C.I. pigment blue 15:1, C.I. pigment blue 15:2, C.I. pigment blue 15:3, C.I. pigment blue 15:4, C.I. pigment blue 15:6 and C.I. pigment blue 16. Among these, in particular, from the point of excellent light resistance, C.I. pigment blue 15:3 and C.I. pigment blue 15:4 are particularly preferable.

The average particle diameter of the phthalocyanine compound has good chroma and weather resistance, and obtains an ink with balanced light resistance even when used in color mixture with an inorganic pigment, and printed matter thereof, preferably 50 to 150 nm, and more preferably 60 to 120 nm. When the average particle diameter is less than 50 nm, weather resistance tends to be weak, and when more than 150 nm, discharge from a nozzle tends to be difficult.

Besides, a black inorganic pigment such as carbon black (C.I. pigment black 7) or a white inorganic pigment such as titanium oxide (C.I. pigment white 6) is processed into an ink, which can be used concomitantly as a matter of course.

The foregoing pigments are preferably contained by 0.1 to 10% by weight in the respective inks, and more preferably contained by 0.5 to 5% by weight. When the content of pigment is less than 0.1% by weight, the concentration of ink tends to be insufficient, and when more than 10% by weight, discharge from a nozzle tends to be difficult.

Amazingly, by use in combination of a yellow ink, a magenta ink and a cyan ink respectively including the foregoing specific pigments as an ink set, it is possible to color in high concentration compared with an ink set not including the foregoing specific pigments at all needless to say, with an ink not including either of the foregoing specific pigments in the yellow ink, magenta ink and cyan ink, and the printed matter obtained has very good weather resistance. Since the pigments each have light resistance, one with light resistance balance of pigments is given, and there is no case that a certain color is extremely degraded, and pattern can be maintained without color change.

Herein, weather resistance in pigments is resistance particularly to sunlight (light resistance), and means that color is hardly degraded even after exposure in the open air for 5 to 10 years. For example, it can be confirmed in a short time using a tester such as sunshine weather meter, metal weather and super UV.

In the ink used in the present invention, a reactive monomer and/or a reactive oligomer, and a photopolymerization initiator are included other than the foregoing pigments.

The reactive monomer and/or the reactive oligomer are not particularly limited, they are one cured by ultraviolet irradiation, that is, a so-called ultraviolet-curable resin.

The reactive monomer includes, for example, hexafunctional acrylates such as dipentanerythritol hexaacrylate and the modifications; pentafunctional acrylates such as dipentanerythritol hydroxypentaacrylate; tetrafunctional acrylates such as pentaditrimethylolpropane tetraacrylate and pentaerythritol tetraacrylate; trifunctional acrylates such as trimethylolpropane triacrylate, pentaerythritol triacrylate, tris (2-hydroxyethyl)isocyanurate triacrylate and glycertriacrylate; difunctional acrylates such as neopentylglycol hydroxypivalate diacrylate, polytetramethyleneglycol diacrylate, trimethylolpropane acrylate benzoate, diethyleneglycol diacrylate, triethyleneglycol diacrylate, trtraethyleneglycol diacrylate, polyethyleneglycol(200) diacrylate, polyethyleneglycol(400) diacrylate, polyethyleneglycol(600) diacrylate, neopentylglycol diacrylate, 1,3-butandiol diacrylate, 1,4-butanediol diacrylate, 1,6-hexanediol diacrylate, 1,9-nonanediol diacrylate, dimethyloltricyclodecane diacrylate and bisphenol-A diacrylate; and monofunctional acrylates such as caprolactone acrylate, tridecyl acrylate, isodecyl acrylate, isooctyl acrylate, isomyristyl acrylate, isostearyl acrylate, 2-ethylhexyl-diglycol diacrylate, 2-hydroxybutyl acrylate, 2-acryloyloxyethyl hexahydrophthalate, neopentylglycol acrylate benzoate, isoamyl acrylate, lauryl acrylate, stearyl acrylate, butoxyethyl acrylate, ethoxyethyleneglycol acrylalate, methoxytriethyleneglycol acrylate, methoxypolyethyleneglycol acrylate, methoxydipropyleneglycol acrylate, phenoxyethyl acrylate, phenoxypolyethyleneglycol acrylate, nonylphenol acrylate, tetrahydrofurfuryl acrylate, isobonyl acrylate, 2-hydroxyethyl acrylate, 2-hydroxypropyl acrylate, 2-hydroxy-3-phenoxypropyl acrylate, 2-acryloyloxyethyl succinate, 2-acryloyloxyethyl phthalate and 2-acryloyloxyethyl-2-hydroxyethyl phthalate. Further, a reactive monomer that phosphorous or fluorine, a functional group of ethylene oxide or propylene oxide is given to these is listed. These reactive monomers can be used alone or in combination thereof. Above all, from the point of excellent toughness and flexibility, difunctional monomers are preferable. Among these, from the point of yellowing resistance, aliphatic reactive monomers composed of hydrocarbons are preferable, specifically such as 1,6-hexanediol diacrylate, neopentylglycol diacrylate, 1,3-butanediol diacrylate, 1,4-butanediol diacrylate and 1,9-nonanediol diacrylate.

The above-described reactive monomer is preferably contained by 50 to 85% by weight in an ink. When less than 50% by weight, since viscosity of ink becomes high, discharge defect may occur, and when more than 85%, other agents necessary for curing may run short and curing may become bad.

A reactive oligomer may include urethane acrylate, polyester acrylate, epoxy acrylate, silicon acrylate and polybutadiene acrylate, they may be used alone or in composition thereof. Above all, urethane acrylates are preferable from the point of excellent toughness, flexibility and adhesion. Among these, an aliphatic urethane acrylate composed of hydrocarbon is further preferable from yellowing resistance in the same manner as the reactive monomer.

The above-described reactive oligomer is preferably contained by 1 to 40% by weight in an ink, more preferably 5 to 40% by weight, and further preferably 10 to 30% by weight. When the reactive oligomer is present in 1 to 40% by weight, there is a tendency that toughness, flexibility and adhesion can be more improved.

A photopolymerization initiator includes benzoins, benzyl ketals, aminoketones, titanocenes, bisimdazoles, hydroxyketones and acylphosphine oxides, they may be used alone or in composition thereof. Above all, hydroxyketones and acylphosphine oxides are preferable from the point of high reactivity and yellowing resistance.

The added amount of the photopolymerization initiator is preferably is 1 to 10% by weight in an ink, and more preferably 3 to 7% by weight. When less than 1% by weight, polymerization may be insufficient, and a film may not be cured, and when more than 10% by weight, neither more curing ratio nor efficiency increase in curing speed can be expected, and cost becomes high.

Besides, in the ink of the present invention, a dispersant may be added according to need.

The dispersant includes an anionic surfactant, a cationic surfactant, a nonionic surfactant, an amphoteric surfactant and a polymeric dispersant, and they can be used alone or in combination thereof.

The added amount of the above-described dispersant is suitably determined by the sort of pigment to be dispersed, but it is preferably 5 to 150 parts by weight relative to 100 parts by weight of pigment, and more preferably 30 to 80 parts by weight. When the dispersant is less than 5 parts by weight, there is a tendency that pigments are not dispersed well, and when more than 150 parts by weight, there is a tendency that the dispersant disturbs dispersion of pigments, and ink cost becomes high.

Further, according to need, additives can be added, such as a sensitizing agent for promoting initiation reaction of photopolymerization initiator, heat stabilizer, antioxidant, antiseptic, defoaming agent, penetrating agent, resin binder, resin emulsion, reduction preventing agent, leveling agent, pH adjuster, pigment derivative, polymerization inhibitor, ultraviolet absorber and light stabilizer.

The ink used in the present invention can be obtained as follows: materials used are mixed, further, the mixture is dispersed using a dispersing machine such as roll mill, ball mill, colloid mill, jet mill and bead mil, followed by filtration. Among these, bead mill is preferable because dispersion can be done in large amount for a short time.

Viscosity of the above-described ink is preferably 1 to 20 mPa·s at 50° C., and more preferably 2 to 15 mPa·s. When the viscosity is less than 1 mPa·s, discharge amount may be too large and discharge becomes may become unstable because of too low viscosity of ink, and when more than 20 mPa·s, the discharge may not be performed because viscosity of ink is too high.

Surface tension at discharge is preferably 20 to 40 dyne/cm from consideration of treating various raw materials, and more preferably 25 to 35 dyne/cm. When less than 20 dyne/cm, there is a tendency that image blurs because wettability is too high, and supply of ink to a printer head becomes difficult. When more than 40 dyne/cm, there is a tendency that ink is repelled and image streaks because wettability becomes bad.

An inkjet recording apparatus using the ink set of the present invention is not particularly limited. For example, a continuous method such as charge modulation method, a microdot method, a charged jet control method and an ink mist method; and an on-demand method such as a stemme method, a pulse jet method, a Bubble jet (trademark) method and an electrostatic suction method can all be adopted.

A head equipped in an ordinary inkjet printer is provided with a heating apparatus, and viscosity may be lowered by heating for discharge. The heating temperature is 25 to 150° C., and preferably in a range of 30 to 70° C. The heating temperature is determined by considering thermal hardenability of a reactive monomer and/or a reactive oligomer used, and is set to a temperature lower than an onset temperature of hardening.

Regarding the condition of ultraviolet irradiation, output power of an ultraviolet lamp is preferably 50 to 280 W/cm, and more preferably 80 to 200 W/cm. When the output power of an ultraviolet lamp is less than 50 W/cm, there is a tendency that an ink is not sufficiently hardened due to lack of peak strength of ultraviolet light and accumulated amount of light, and when more than 280 W/cm, there is a tendency that a base material deforms or melts by heat of an ultraviolet lamp, and hardened film of ink deteriorates.

Irradiation time of ultraviolet ray is preferably 0.1 to 20 seconds, and more preferably 0.5 to 10 seconds. When the irradiation time of an ultraviolet lamp is more than 20 seconds, there is a tendency that a base material deforms or melts by heat of an ultraviolet lamp, and hardened film of an ultraviolet-curable ink deteriorates, and when less than 0.1 seconds, accumulated amount of ultraviolet ray is insufficient, so there is a tendency that an ultraviolet-curable ink is not sufficiently hardened.

The ink discharge amount onto the foregoing base material is preferably 1 to 200 g/m$^2$, and more preferably 5 to 150 g/m$^2$. When less than 1 g/m$^2$, there is a tendency that sufficient coloring becomes difficult, when more than 200 g/m$^2$, there is a tendency that blur occurs because the discharge amount is too much, or insufficient hardening takes place.

Since the ink set of the present invention is very good in weather resistance, it can be preferably used particularly in outdoor use: as exterior materials such as exterior wall, roof material, pillar and door of building; exterior structural materials such as gate, fence and entrance approach; advertising displays and signs.

In a colored board for outdoor use having an ink layer by the foregoing ink set of the present invention, the ink layer has weather resistance, thus color degradation is hardly observed even used outdoors. Since the ink layer is composed of an ultraviolet-curable ink, it has good adhesion to a base material.

A base material of a colored board is not particularly limited, but includes plastics, ceramics, glasses, woods, metals, and ones subjected to primer treatment thereon. Above all, metals and ceramics are preferable from consideration of applications for outdoor use. The above-described metals are not particularly limited, but include ordinary steel plate, plated steel plate such as Galvalume steel plate, coated steel plate, steel plates such as stainless steel plate, aluminum plate and copper plate.

Further, like a metal siding material, PCM steel plate wherein various kinds of resin coat are provided on metals as a base coat layer is listed as well. The metal siding material may be provided with concavity and convexity by processing such as embossing and draw forming. Further, the rear surface may be covered with backing materials such as aluminum-laminated craft paper using resin foam or inorganic raw materials such as gypsum board as a core for providing heat insulation and sound insulation.

The ceramics are not particularly limited, but include an unglazed ceramic plate (water absorbing property), a ceramic plate glazed and fired (resistance to water absorption) and a cement plate. Further, like the fiber reinforced cement siding, one that is formed into the form of plate using cement raw materials and fibrous raw materials is listed as well. The fiber reinforced cement siding may be provided with concavity and convexity by emboss processing.

Further, after printing, it is also possible to conduct a post processing such as top coat and embossing finish to a printed matter, which is not particularly limited.

The thickness and shape of a base material are not particularly limited, and they can be suitably chosen according to applications, places to be used and shapes.

The thickness of the foregoing ink layer is preferably 5 to 150 μm. When less than 5 μm, there is a tendency that sufficient coloring becomes difficult, and when more than 150 μm, there is a tendency that crack and peeling of printed layer occur because ink film thickness becomes too thick.

Providing a base material with an ink layer may be done using the foregoing inkjet recording apparatus. It may be provided on the whole surface of a base material or provided partially in a pattern. The colored pattern includes, for example, brick pattern, tile pattern and grain pattern. The brick pattern is, as shown in FIG. 1, a pattern in which a plurality of bricks 10 are stacked and boundary regions 20 are formed.

As described above, since the ink layer provided is excellent in adhesion to a base material, peeling is hardly undergone even when embossing or folding processing is carried out as a post processing.

EXAMPLES

Hereinafter, the present invention is explained by using Examples in reference to the Drawing attached, but the present invention by no means limited to these Examples.

Example 1

[Production of Yellow Ink]

Three parts by weight of Sicopal Yellow L1100 (C.I. pigment yellow 184, bismuth vanadate, manufactured by BASF Japan Ltd.) as an inorganic pigment, 3 parts by weight of dispersant (Disperbyk-168, polymeric dispersant, manufactured by BykChemie Corporation), 20 parts by weight of reactive oligomer (CN985B88, aliphatic urethane acrylate, difunctional one, manufactured by Sartomer Company Inc.), 69 parts by weight of reactive monomer (SR238F, 1,6-hexanediol diacrylate, difunctional one, manufactured by Sartomer Company Inc.) and 5 parts by weight of photopolymerization initiator (Irgacure 2959, 1-[4-(2-hydroxyethoxy)-phenyl]2-hydroxy-2-methyl-1-propan-1-one, manufactured by Ciba Specialty Chemicals Inc.) were added, after dispersion using a bead mill dispersing machine, filtration was conducted to remove impurities, thereby to produce a homogeneous yellow ink. The average particle diameter of the pigment used was 89 nm. Additionally, the measurement of particle diameter was done by a micro-track grain size distribution measuring device (manufactured by Nikkiso Co., Ltd.). Hereinafter in the same manner, particle diameters were measured.

[Production of Magenta Ink]

A magenta ink was produced in the same manner as the yellow ink except that 130ED (C.I. pigment red 101, iron oxide, manufactured by Toda Kogyo Corp.) was used as an inorganic pigment. The average particle diameter of the pigment used was 151 nm.

[Production of Cyan Ink]

A cyan ink was produced in the same manner as the yellow ink except that IRGALITE Blue GLVO (C.I. pigment blue 15:4, copper phthalocyanine, manufactured by Ciba Specialty Chemicals Inc.) was used as an organic pigment. The average particle diameter of the pigment used was 65 nm.

The inks obtained were used as an ink set, and it was printed on a base material in the following condition by an inkjet printer, and the inks were cured by an ultraviolet lamp.

[Base Material]

A: Metal plate (Galvalume steel plate, acryl PCM coated product, thickness 1 mm)

[Printing Condition]

| | |
|---|---|
| Nozzle diameter: | 70 μm |
| Applied voltage: | 50 V |
| Pulse width: | 20 μs |
| Driving frequency: | 3 kHz |
| Resolution: | 180 dpi |
| Heating temperature: | 60° C. |

[Ultraviolet Irradiation Condition]

| | |
|---|---|
| Kind of lamp: | Metal halide lamp |
| Voltage: | 120 W/cm |
| Irradiation time: | 1 second |
| Irradiation distance: | 10 cm |

The printed matter was evaluated by the following evaluation method.
Evaluation
[Evaluation Patterns 1 to 3]

Evaluation pattern 1: Monochromatic plain pattern printed by respective inks of yellow, magenta and cyan
The ink discharge amount onto a base material was each 20 g/m$^2$.

Evaluation pattern 2: Matrix pattern in which two colors were selected from yellow, magenta and cyan inks, and then by the ratio of Table 1 (neutral colors (5 to 95), by every 5, the ink amounts of two colors were adjusted for the total to be 100), the selected colors were discharged on a base material for printing The total ink discharge amount onto a base material was set to 20 g/m$^2$. Here, the matrix pattern printed is a pattern in which the regions each colored in a square are disposed laterally in a line with adjacent regions adjoining one another. For example, when a yellow ink and a magenta ink are used, twenty-one squares are lined, and color tone is gradually changed from left to right, yellow→orange→red.

TABLE 1

| Yellow ink | 100 | 95-5 | 0 |
|---|---|---|---|
| Magenta ink | 0 | 5-95 | 100 |
| Magenta ink | 100 | 95-5 | 0 |
| Cyan ink | 0 | 5-95 | 100 |
| Cyan ink | 100 | 95-5 | 0 |
| Yellow ink | 0 | 5-95 | 100 |

Evaluation pattern 3: Brown brick pattern printed by using the inks of three colors of yellow, magenta and cyan inks
The total ink discharge amount onto a base material was set to 20 g/m$^2$. FIG. 1 is an explanatory drawing of brick pattern printed by using an ink set of the present invention and discharging the inks onto a base material. As shown in FIG. 1, the brick pattern is a pattern in which a plurality of bricks 10 were stacked, and boundary regions 20 were formed.
[Evaluation Method]
(1) Color Concentration Color concentration of evaluation pattern 1 was measured by a reflection densitometer (Macbeth RD918). The result is shown in Table 2. The larger the numeric value is the higher concentration.
(2) Color Representation Color representation of evaluation pattern 2 was evaluated before and after weather resistance test. The weather resistance test condition is as follows.

<Weather Resistance Test Condition>
1) Light source: Water-cooling type metal halide lamp
2) Illumination intensity: 100 mW/cm$^2$
3) Wavelength: 295 to 450 nm
4) Temperature: 60° C. (irradiation), 30° C. (bedewing)
5) Humidity: 50% (irradiation), 90% (bedewing)
6) Cycle: Irradiation for 5 hours, bedewing for 5 hours
7) Shower: 10 seconds before and after bedewing
8) Test time: 250 hours (corresponding to 5-year exposure)

<Evaluation of Color Representation (1)>
Color representation of evaluation pattern 2 was evaluated by naked eye before and after weather resistance test. The result is shown in Table 3.
<Evaluation Criteria>
◯: Brilliant color gradation is represented over all color regions from yellow to orange to red, from red to purple to blue, or from blue to green to yellow in a balanced manner.
x: There is an uncomfortable feeling in connection of colors, a brilliant color gradation from yellow to orange to red, from red to purple to blue, or from blue to green to yellow is not represented in a balanced manner.

<Evaluation of Color Representation (2)>
In the evaluation of pattern 2, the part of neutral color (50) that the ratio of discharge amounts in inks of two colors was 50:50 was measured for chroma C* and hue angle h. The measurements of chroma and hue angle were conducted before and after weather resistance test, and measured by L*C*h color coordination system using a spectrophotometer (CM-3600d, manufactured by Konica Minolta Sensing Co., Ltd.). The result is shown in Table 3.

Here, L*C*h color coordination system is based on the L*a*b* color coordination system (JIS Z 8729), L*, C* and "h" represent brightness, chroma and hue angle, respectively. "h" is an angle moved relative to the hue of anticlockwise rotation when a* axis of red direction in L*a*b* color coordination system is set at 0° and the a* axis is set as a standard, and position of color is known by the angle. There are shown red when h is 0°, yellow when 90°, green when 180°, and blue when 270°. In L*a*b* color coordination system, it means that colorfulness increases more when C* is a larger value, and color becomes more dull when C* is a smaller value.

Further, based on the description of Table 3, the change of chroma and hue angle when a printed matter was subjected to weather resistance test is shown in Table 4. Specifically, Table 4 shows a value that the chroma and hue angle before weather resistance test are subtracted respectively from the chroma and hue angle after weather resistance test.
(3) Weather Resistance Weather resistance of the evaluation pattern 3 was tested by a super UV tester. The weather resistance test condition is as follow.
<Weather Resistance Test Condition>
1) Light source: Water-cooling type metal halide lamp
2) Illumination intensity: 100 mW/cm$^2$
3) Wavelength: 295 to 450 nm
4) Temperature: 60° C. (irradiation), 30° C. (bedewing)
5) Humidity: 50% (irradiation), 90% (bedewing)
6) Cycle: Irradiation for 5 hours, bedewing for 5 hours
7) Shower: 10 seconds before and after bedewing
8) Test time: 250 hours (corresponding to 5-year exposure)
<Weather Resistance Evaluation (1)> Discoloration (Light Resistance of Pigment)

Color difference before and after weather resistance test was determined by a grey scale for discoloration (JIS L 0804). The result is shown in Table 5. The grey scale for discoloration is constituted by 9 grades of, 5, 4-5, 4, 3-4, 3, 2-3, 2, 1-2 and 1, in the case of no color difference, it is evaluated as 5.

<Weather Resistance Evaluation (2)> Peeling of UV-Cured Resin (Scratching Hardness)

The scratching hardness of a colored board before and after weather resistance test was confirmed. A pencil was used in hardness test, the test was done at an angle of 45° between the colored board and pencil, and at a load of 1 kg. In the evaluation, hardness one lower than the pencil hardness in which the ink layer was peeled was defined as hardness. The result is shown in Table 5.

<Weather Resistance Evaluation (3)> Peeling Between Base Material and Ink Layer (Adhesiveness Between Base Material and UV Resin)

The adhesiveness of a colored board before and after weather resistance test was confirmed. In the adhesiveness test, using a cutter knife, eleven lines reaching a base material were drawn at the intervals of 1 mm each lengthwise and crosswise to produce grids of 100. Next, a cellophane tape was attached on the grids, and the cellophane tape was quickly peeled off, and the state of colored board was confirmed. The evaluation was done in accordance with the contents of JIS K5600-5-6, by the following 4 levels. The result is shown in Table 5.

1: a small peeling of printed layer at intersection of cuts is observed.

2: a printed layer is peeled along the edge of cut and/or at intersection.

3: a large peeling of printed board occurs along the edge of cut partially or wholly, and/or various parts are peeled partially or wholly.

4: a large peeling of printed board occurs along the edge of cut partially or wholly, and/or several grids are peeled partially or wholly.

Example 2

[Production of Yellow Ink]

A yellow ink was produced in the same manner as Example 1 except that as an inorganic pigment, Sicotrans Yellow L1916 (C.I. pigment yellow 42, iron oxide, manufactured by BASF Japan Ltd.) was used. The average particle diameter of the pigment used was 75 nm.

[Production of Magenta Ink]

A magenta ink was produced in the same manner as Example 1 except that as an organic pigment, IRGAZIN Red 179 (C.I. pigment red 179, condensed polycyclic compound, manufactured by Ciba Specialty Chemicals Inc.) was used. The average particle diameter of the pigment used was 54 nm.

[Production of Cyan Ink]

A cyan ink was produced in the same manner as Example 1 except that as an organic pigment, IRGALITE Blue GLO (C.I. pigment blue 15:3, copper phthalocyanine, manufactured by Ciba Specialty Chemicals Inc.) was used. The average particle diameter of the pigment used was 139 nm.

The inks obtained were used as an ink set, and it was printed in the same manner as Example 1, and the evaluation of the printed matter obtained was conducted. The result is shown in Tables 2 to 5.

Example 3

The inks obtained in Example 1 were used as an ink set, and it was printed in the same manner as Example 1 except for the ink discharge amount onto a base material, thereby obtaining a printed matter. The discharge amount of each ink in the evaluation pattern 1 was 50 g/m². The total ink discharge amounts in the evaluation patterns 2 and 3 were both 50 g/m².

The evaluation of the printed matter obtained was conducted in the same manner as Example 1. The result is shown in Tables 2 to 5.

Example 4

[Production of Yellow Ink]

0.5 Parts by weight of Sicopal Yellow L1100 (C.I. pigment yellow 184, bismuth vanadate, manufactured by BASF Japan Ltd.) as an inorganic pigment, 0.5 parts by weight of dispersant (Disperbyk-168, polymeric dispersant, manufactured by BykChemie Corporation), 22 parts by weight of reactive oligomer (CN985B88, aliphatic urethane acrylate, difunctional one, manufactured by Sartomer Company Inc.), 72 parts by weight of reactive monomer (SR238F, 1,6-hexanediol diacrylate, difunctional one, manufactured by Sartomer Company Inc.) and 5 parts by weight of photopolymerization initiator (Irgacure 2959, 1-[4-(2-hydroxyethoxy)-phenyl]2-hydroxy-2-methyl-1-propan-1-one, manufactured by Ciba Specialty Chemicals Inc.) were added, after dispersion using a bead mill dispersing machine, filtration was conducted to remove impurities, thereby to produce a homogeneous yellow ink. The average particle diameter of the pigment used was 89 nm.

[Production of Magenta Ink]:

A magenta ink was produced in the same manner as the yellow ink except that Paliogen Red L3910D (C.I. pigment red 178, condensed polycyclic compound, manufactured by BASF Japan Ltd.) was used as an organic pigment. The average particle diameter of the pigment used was 151 nm.

[Production of Cyan Ink]:

A cyan ink was produced in the same manner as the yellow ink except that IRGALITE Blue GLVO (C.I. pigment blue 15:4, copper phthalocyanine, manufactured by Ciba Specialty Chemicals Inc.) was used as an organic pigment. The average particle diameter of the pigment used was 65 nm.

The inks obtained were used as an ink set, and it was printed in the same manner as Example 1 except for the ink discharge amount onto a base material, thereby obtaining a printed matter. The discharge amount of each ink in the evaluation pattern 1 was 150 g/m². The total ink discharge amounts in the evaluation patterns 2 and 3 were both 150 g/m². The evaluation of the printed matter obtained was conducted in the same manner as Example 1. The result is shown in Tables 2 to 5.

Example 5

The inks obtained in Example 4 were used as an ink set, and it was printed in the same manner as Example 1 except for the ink discharge amount onto a base material, thereby obtaining a printed matter. The discharge amount of each ink in the evaluation pattern 1 was 190 g/m². The total ink discharge amounts in the evaluation patterns 2 and 3 were both 190 g/m². The evaluation of the printed matter obtained was conducted in the same manner as Example 1. The result is shown in Tables 2 to 5.

Example 6

[Production of Yellow Ink]

Eight parts by weight of Sicopal Yellow L1100 (C.I. pigment yellow 184, bismuth vanadate, manufactured by BASF Japan Ltd.) as an inorganic pigment, 8 parts by weight of dispersant (Disperbyk-168, polymeric dispersant, manufactured by BykChemie Corporation), 15 parts by weight of reactive oligomer (CN985B88, aliphatic urethane acrylate, difunctional one, manufactured by Sartomer Company Inc.), 64 parts by weight of reactive monomer (SR238F, 1,6-hexanediol diacrylate, difunctional one, manufactured by Sartomer Company Inc.) and 5 parts by weight of photopolymerization initiator (Irgacure 2959, 1-[4-(2-hydroxyethoxy)-phenyl]2-hydroxy-2-methyl-1-propan-1-one, manufactured by Ciba Specialty Chemicals Inc.) were added, after dispersion using a bead mill dispersing machine, filtration was conducted to remove impurities, thereby to produce a homogeneous yellow ink. The average particle diameter of the pigment used was 89 nm.

[Production of Magenta Ink]

A magenta ink was produced in the same manner as the yellow ink except that PV FAST RED B (C.I. pigment red 149, condensed polycyclic compound, manufactured by Clariant Japan K.K.) was used as an organic pigment. The average particle diameter of the pigment used was 151 nm.

[Production of Cyan Ink]

A cyan ink was produced in the same manner as the yellow ink except that IRGALITE Blue GLVO (C.I. pigment blue 15:4, copper phthalocyanine, manufactured by Ciba Specialty Chemicals Inc.) was used as an organic pigment. The average particle diameter of the pigment used was 65 nm.

The inks obtained were used as an ink set, and it was printed in the same manner as Example 1 except for the ink discharge amount onto a base material, thereby obtaining a printed matter. The discharge amount of each ink in the evaluation pattern 1 was 5 g/m². The total ink discharge amounts in the evaluation patterns 2 and 3 were both 5 g/m². The evaluation of the printed matter obtained was conducted in the same manner as Example 1. The result is shown in Tables 2 to 5.

Comparative Example 1

[Production of Yellow Ink]

A yellow ink was produced in the same manner as Example 1 except that an organic pigment, PV Fast Yellow H2G (C.I. pigment yellow 120, benzimidazolone, manufactured by Clariant Japan K.K.) was used. The average particle diameter of the pigment used was 92 nm.

[Production of Magenta Ink]

A magenta ink was produced in the same manner as Example 1.

[Production of Cyan Ink]:

A cyan ink was produced in the same manner as Example 1.

The inks obtained were used as an ink set, and it was printed in the same manner as Example 1, and the evaluation of the printed matter obtained was conducted. The result is shown in Tables 2 to 5.

Comparative Example 2

[Production of Yellow Ink]

A yellow ink was produced in the same manner as Example 1.

[Production of Magenta Ink]

A magenta ink was produced in the same manner as Example 1 except that an organic pigment, Graphtol Rubine L6B (C.I. pigment red 57:1, Ca lake, manufactured by Clariant Japan K.K.) was used. The average particle diameter of the pigment used was 151 nm.

[Production of Cyan Ink]

A cyan ink was produced in the same manner as Example 1.

The inks obtained were used as an ink set, and it was printed in the same manner as Example 1, and the evaluation of the printed matter obtained was conducted. The result is shown in Tables 2 to 5.

Comparative Example 3

[Production of Yellow Ink]

A yellow ink was produced in the same manner as Example 1.

[Production of Magenta Ink]

A magenta ink was produced in the same manner as Example 1.

[Production of Cyan Ink]

A cyan ink was produced in the same manner as Example 1 except that an organic pigment, Fanal Blue D6340 (C.I. pigment blue 1, Victoria blue PTM lake, manufactured by BASF Japan Ltd.) was used. The average particle diameter of the pigment used was 52 nm.

The inks obtained were used as an ink set, and it was printed in the same manner as Example 1, and the evaluation of the printed matter obtained was conducted. The result is shown in Tables 2 to 5.

Comparative Example 4

[Production of Yellow Ink]

Three parts by weight of an inorganic pigment, Sicotan Yellow L1010 (C.I. pigment yellow 53, composite oxide, manufactured by BASF Japan Ltd.), 5 parts by weight of dispersant HPD-96 (polymeric dispersant, solid content 34%, manufactured by Johnson Polymer Corp.), 10 parts by weight of binder Joncryl 741 (solid content 49%, manufactured by Johnson Polymer Corp.), 3 parts by weight of a moistening agent, propylene glycol (available from Showa Denko K.K.), 1 part by weight of a moistening agent, urea (available from Mitsui Chemicals, Inc.) and 78 parts by weight of pure water were added, after dispersion using a bead mill dispersing machine, filtration was conducted to remove impurities, thereby to produce a homogeneous yellow ink. The average particle diameter of the pigment used was 135 nm.

[Production of Magenta Ink]:

A magenta ink was produced in the same manner as the yellow ink except that an inorganic pigment, DAIPYROXIDE BROWN 9220 (C.I. pigment brown 22, composite oxide, manufactured by Dainichiseika Color & Chemicals Mfg Co., Ltd.) was used. The average particle diameter of the pigment used was 94 nm.

[Production of Cyan Ink]:

A cyan ink was produced in the same manner as the yellow ink except that an inorganic pigment, DAIPYROXIDE BLUE 9410 (C.I. pigment blue 28, composite oxide, manufactured by Dainichiseika Color & Chemicals Mfg Co., Ltd.) was used. The average particle diameter of the pigment used was 88 nm.

The inks obtained were used as an ink set, and it was printed in the same manner as Example 1, and the evaluation of the printed matter obtained was conducted. The result is shown in Tables 2 to 5.

TABLE 2

| Ex. No. | Color concentration | | |
|---|---|---|---|
| | Yellow | Red | Blue |
| 1 | 1.38 | 1.31 | 1.42 |
| 2 | 1.27 | 1.48 | 1.45 |
| 3 | 1.72 | 1.65 | 1.87 |
| 4 | 1.54 | 1.66 | 1.63 |
| 5 | 1.71 | 1.83 | 1.90 |
| 6 | 1.33 | 1.55 | 1.49 |
| Com. Ex. 1 | 1.44 | 1.34 | 1.41 |

TABLE 2-continued

| | Color concentration | | |
|---|---|---|---|
| Ex. No. | Yellow | Red | Blue |
| Com. Ex. 2 | 1.35 | 1.43 | 1.46 |
| Com. Ex. 3 | 1.36 | 1.29 | 1.44 |
| Com. Ex. 4 | 0.32 | 0.41 | 0.28 |

According to Table 2, when an ink set of the present invention including a yellow ink, a magenta ink and a cyan ink containing the specific pigments is used, it is known that high-concentration printing can be done. In Examples 3, 4 and 5, it is known that color concentration is particularly high in all colors. On the other hand, in Comparative example 4, it is known that sufficient color concentration is not obtained.

TABLE 3

| | | | | Ex. No. | | | | | | | | | |
|---|---|---|---|---|---|---|---|---|---|---|---|---|---|
| | | | | 1 | 2 | 3 | 4 | 5 | 6 | Com. Ex. 1 | Com. Ex. 2 | Com. Ex. 3 | Com. Ex. 4 |
| Color representation | Before weather resistance test | Visual evaluation | | ○ | ○ | ○ | ○ | ○ | ○ | ○ | ○ | ○ | X |
| | | Neutral color (50) yellow + red | Chroma | 54.1 | 58.4 | 61.6 | 60.9 | 62.3 | 58.8 | 61.1 | 60.7 | 54.3 | 38.2 |
| | | | Hue angle | 50.5 | 47.7 | 50.8 | 46.8 | 45.9 | 47.0 | 49.5 | 43.1 | 50.6 | 44.9 |
| | | Neutral color (50) red + blue | Chroma | 50.9 | 60.9 | 56.1 | 61.7 | 64.6 | 57.5 | 50.3 | 60.0 | 50.1 | 36.1 |
| | | | Hue angle | 305.7 | 302.4 | 303.2 | 310.8 | 308.3 | 313.9 | 304.6 | 305.8 | 304.2 | 320.5 |
| | | Neutral color (50) blue + yellow | Chroma | 55.3 | 56.6 | 61.5 | 60.8 | 63.9 | 57.2 | 60.3 | 56.0 | 57.8 | 35.7 |
| | | | Hue angle | 183.2 | 191.9 | 187.9 | 185.6 | 188.4 | 186.1 | 178.4 | 181.5 | 190.6 | 180.0 |
| | After weather resistance test | Visual evaluation | | ○ | ○ | ○ | ○ | ○ | ○ | X | X | X | X |
| | | Neutral color (50) yellow + red | Chroma | 53.4 | 57.2 | 61.2 | 60.1 | 62.2 | 58.1 | 50.5 | 49.7 | 52.9 | 38.0 |
| | | | Hue angle | 50.2 | 49.2 | 50.6 | 47.5 | 46.4 | 48.3 | 32.1 | 63.5 | 50.1 | 45.4 |
| | | Neutral color (50) red + blue | Chroma | 50.0 | 58.9 | 55.6 | 61.0 | 62.2 | 56.2 | 50.2 | 47.6 | 42.2 | 35.8 |
| | | | Hue angle | 309.0 | 309.8 | 308.8 | 315.7 | 310.1 | 317.5 | 311.2 | 289.0 | 342.5 | 319.3 |
| | | Neutral color (50) blue + yellow | Chroma | 53.1 | 56.6 | 60.5 | 59.9 | 62.4 | 55.8 | 51.9 | 55.5 | 48.8 | 34.9 |
| | | | Hue angle | 178.1 | 187.3 | 179.0 | 179.5 | 180.9 | 180.8 | 256.7 | 176.9 | 110.3 | 177.7 |

TABLE 4

| | Change of chroma and hue angle | | | | | |
|---|---|---|---|---|---|---|
| | Neutral color (50) yellow + red | | Neutral color (50) red + blue | | Neutral color (50) blue + yellow | |
| Ex. No. | Chroma | Hue angle | Chroma | Hue angle | Chroma | Hue angle |
| 1 | −0.7 | −0.3 | −0.9 | 3.3 | −2.2 | −5.1 |
| 2 | −1.2 | 1.5 | −2.0 | 7.4 | 0 | −4.6 |
| 3 | −0.4 | −0.2 | −0.5 | 5.6 | −1.0 | −8.9 |
| 4 | −0.8 | 0.7 | −0.7 | 4.9 | −0.9 | −6.1 |
| 5 | −0.1 | 0.5 | −2.4 | 1.8 | −1.5 | −7.5 |
| 6 | −0.7 | 1.3 | −1.3 | 3.6 | −1.4 | −5.3 |
| Com. Ex. 1 | −10.6 | −17.4 | −0.1 | 6.6 | −8.4 | 78.3 |
| Com. Ex. 2 | −1.1 | 20.4 | −12.4 | −16.8 | −0.5 | −4.6 |
| Com. Ex. 3 | −1.4 | −0.5 | −7.9 | 38.3 | −9.0 | −80.3 |
| Com. Ex. 4 | −0.2 | 0.5 | −0.3 | −1.2 | −0.8 | −2.3 |

According the visual evaluation result described in Table 3, the printed matter obtained by using the ink set of the present invention (Examples 1 to 6) is represented with a brilliant color gradation over all color regions from yellow to red, from red to blue, and from blue to yellow in a balanced manner. It is known that such color representation does not deteriorate even after undergoing weather resistance test. On the other hand, in Comparative examples 1 to 3, deterioration of color representation occurs after undergoing weather resistance test.

As described above, Table 4 shows a value that the chroma and hue angle before weather resistance test is subtracted respectively from the chroma and hue angle after weather resistance test based on described in Table 3, thus, the change of the chroma and hue angle by undergoing weather resistance test of the printed matter can be known from Table 4.

According to Table 4, in Examples 1 to 6, neutral color with high chroma is obtained, and there can be no color change from the fact that the chroma and hue angle hardly change even after undergoing weather resistance test. In Comparative examples 1 to 3, although neutral color with high chroma is obtained, the chroma and hue angle change markedly by undergoing weather resistance test, which shows color change. Specifically, color change is observed in neutral color (50) (yellow+red) and neutral color (50) (blue+yellow) in Comparative example 1, neutral color (50) (yellow+red) and neutral color (50) (red+blue) in Comparative example 2, and neutral color (50) (red+blue) and neutral color (50) (blue+yellow) in Comparative example 3. In Comparative example 4, there is almost no change in chroma and hue angle by undergoing weather resistance test, but it is known that neutral color only with low chroma is obtained.

TABLE 5

| | | Weather resistance | | | |
|---|---|---|---|---|---|
| | | Hardness | | Adhesiveness | |
| Ex. No. | Light resistance | Before test | After test | Before test | After test |
| 1 | 5 | 2H | 2H | 1 | 1 |
| 2 | 4-5 | 2H | 2H | 1 | 1 |
| 3 | 4-5 | 2H | 2H | 1 | 1 |
| 4 | 4 | 2H | 2H | 1 | 1 |
| 5 | 4-5 | 2H | 2H | 2 | 2 |
| 6 | 4 | 2H | H | 1 | 2 |

TABLE 5-continued

| | | Weather resistance | | | |
|---|---|---|---|---|---|
| | | Hardness | | Adhesiveness | |
| Ex. No. | Light resistance | Before test | After test | Before test | After test |
| Com. Ex. 1 | 2 | 2H | 2H | 1 | 1 |
| Com. Ex. 2 | 1-2 | 2H | 2H | 1 | 1 |
| Com. Ex. 3 | 2 | 2H | 2H | 1 | 1 |
| Com. Ex. 4 | 5 | H | 2B | 2 | 3 |

According to Table 5, the printed matter obtained by using the ink set of the present invention (Examples 1 to 6) has almost no color change by undergoing weather resistance test, and has excellent light resistance. On the other hand, in Comparative examples 1 to 3, it is known that color change is large and light resistance is inferior. After undergoing weather resistance test, in Examples 1 to 5, there is no change in hardness and adhesiveness, but in Comparative example 4, both hardness and adhesiveness deteriorate.

INDUSTRIAL APPLICABILITY

The present invention can provide an ink set capable of conducting high-concentration printing and obtaining a brilliant printed matter being excellent in color representation, particularly, color representation of neutral color from yellow to red, from red to blue and from blue to yellow, and weather resistance.

The invention claimed is:

1. A light resistant ultraviolet-curable inkjet ink set comprising a yellow ink, a magenta ink and a cyan ink each respectively containing a pigment, a reactive monomer of at least one selected from the group consisting of 1,6-hexanediol diacrylate, neopentylglycol diacrylate, 1,3-butanediol diacrylate, 1,4-butanediol diacrylate and 1,9-nonanedoil diacrylate and/or a reactive oligomer of an aliphatic urethane acrylate composed of hydrocarbon, and a photopolymerization initiator of hydroxyketones and/or acylphosphine oxides, wherein the pigments in the inks of the ink set are one of the combinations of pigments selected from the group consisting of:
   (1) pigment included in the yellow ink is C.I. pigment yellow 184, pigment included in the magenta ink is C.I. pigment red 101, pigment included in the cyan ink is C.I. pigment blue 15:4;
   (2) pigment included in the yellow ink is C.I. pigment yellow 42, pigment included in the magenta ink is C.I. pigment red 179, pigment included in the cyan ink is C.I. pigment blue 15:3;
   (3) pigment included in the yellow ink is C.I. pigment yellow 184, pigment included in the magenta ink is C.I. pigment red 178, pigment included in the cyan ink is C.I. pigment blue 15:4;
   (4) pigment included in the yellow ink is C.I. pigment yellow 184, pigment included in the magenta ink is C.I. pigment red 149, pigment included in the cyan ink is C.I. pigment blue 15:4.

2. The ultraviolet-curable inkjet ink set of claim 1, wherein an average particle diameter of the pigment included in the yellow ink is 50 to 200 nm, an average particle diameter of the pigment included in the magenta ink is 30 to 300 nm, and an average particle diameter of the pigment included in the cyan ink is 50 to 150 nm.

3. The ultraviolet-curable inkjet ink set of claim 1, wherein the pigments are contained by 0.1 to 10% by weight in respective inks.

4. The ultraviolet-curable inkjet ink set of claim 2, wherein the pigments are contained by 0.1 to 10% by weight in respective inks.

5. The ultraviolet-curable inkjet ink set of claim 1, wherein the ink when applied to a material and hardened by ultraviolet curing has a weather resistance suitable for outdoor use.

6. A colored board for outdoor use on which the inks of the ink set of claim 1 are printed.

7. An exterior material on which the inks of the ink set of claim 1 are printed.

8. An exterior structural material on which the inks of the ink set of claim 1 are printed.

9. An advertising display on which the inks of the ink set of claim 1 are printed.

10. A coloring method comprising a step of printing a colored design on the surface of a base material by discharging the ultraviolet-curable inkjet ink set of claim 1 on the base material.

11. A colored board exposed to sunlight at outdoors, on which a yellow ink, a magenta ink and a cyan ink are printed, and
   the yellow ink, the magenta ink and the cyan ink respectively containing a pigment, a reactive monomer and/or a reactive oligomer, and a photopolymerization initiator, wherein the pigments in the inks of the ink set are one of the combinations of pigments selected from the group consisting of:
   (1) pigment included in the yellow ink is C.I. pigment yellow 184, pigment included in the magenta ink is C.I. pigment red 101, pigment included in the cyan ink is C.I. pigment blue 15:4;
   (2) pigment included in the yellow ink is C.I. pigment yellow 42, pigment included in the magenta ink is C.I. pigment red 179, pigment included in the cyan ink is C.I. pigment blue 15:3;
   (3) pigment included in the yellow ink is C.I. pigment yellow 184, pigment included in the magenta ink is C.I. pigment red 178, pigment included in the cyan ink is C.I. pigment blue 15:4;
   (4) pigment included in the yellow ink is C.I. pigment yellow 184, pigment included in the magenta ink is C.I. pigment red 149, pigment included in the cyan ink is C.I. pigment blue 15:4.

12. A method for maintaining without color change of a colored board for outdoor use exposed to sunlight, the method comprising a step of:
   printing by using an ultraviolet-curable inkjet ink set comprising a yellow ink, a magenta ink and a cyan ink respectively containing a pigment, a reactive monomer and/or a reactive oligomer, and a photopolymerization initiator, wherein the pigments in the inks of the ink set are one of the combinations of pigments selected from the group consisting of:
   (1) pigment included in the yellow ink is C.I. pigment yellow 184, pigment included in the magenta ink is C.I. pigment red 101, pigment included in the cyan ink is C.I. pigment blue 15:4;
   (2) pigment included in the yellow ink is C.I. pigment yellow 42, pigment included in the magenta ink is C.I. pigment red 179, pigment included in the cyan ink is C.I. pigment blue 15:3;

(3) pigment included in the yellow ink is C.I. pigment yellow 184, pigment included in the magenta ink is C.I. pigment red 178, pigment included in the cyan ink is C.I. pigment blue 15:4;
(4) pigment included in the yellow ink is C.I. pigment yellow 184, pigment included in the magenta ink is C.I. pigment red 149, pigment included in the cyan ink is C.I. pigment blue 15:4.

* * * * *